Sept. 19, 1944. P. LANDROCK ET AL 2,358,649
PHOTOGRAPHIC COPYING APPARATUS
Filed Nov. 6, 1941 13 Sheets-Sheet 5
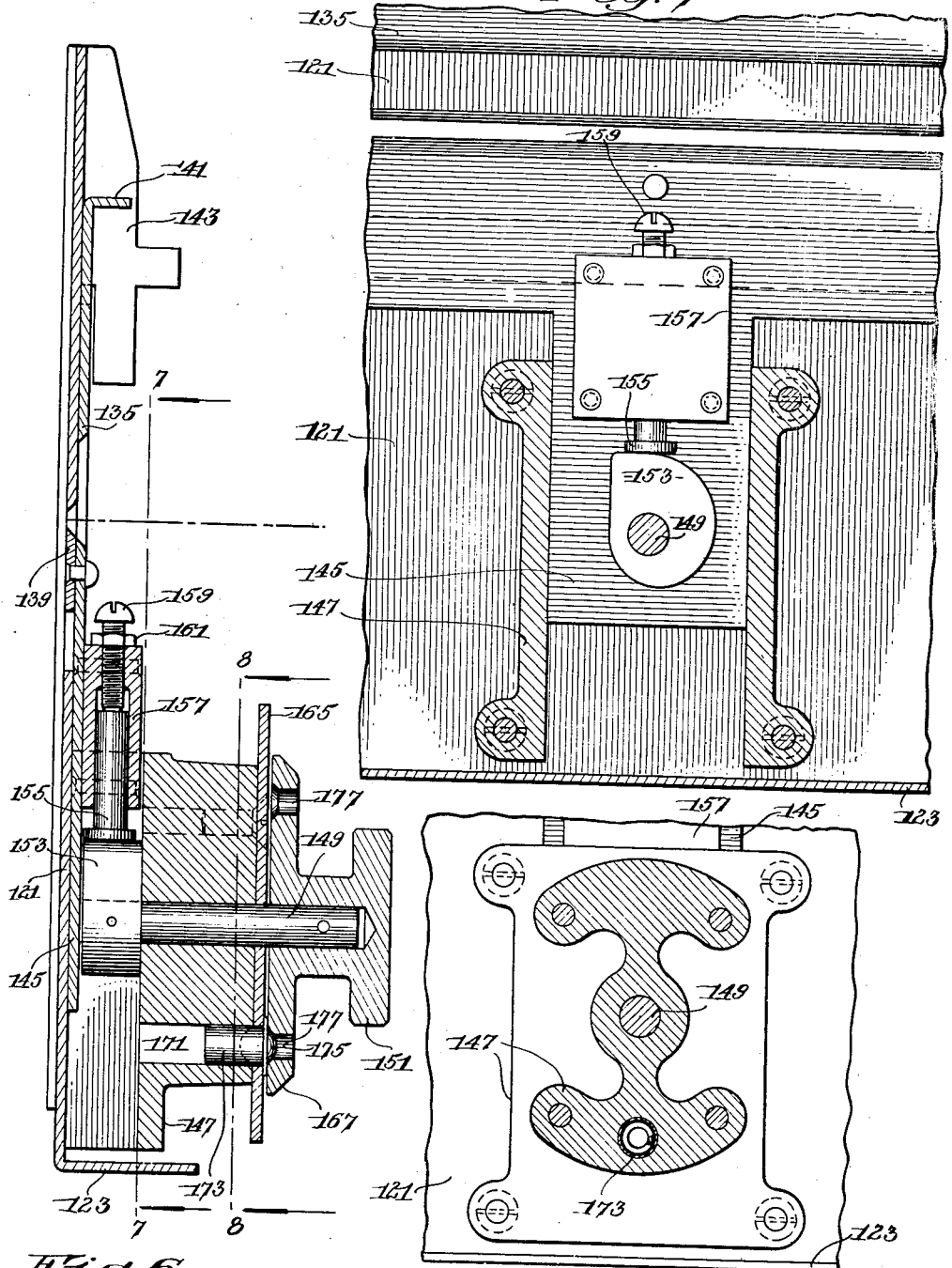
INVENTORS
Paul Landrock
Arthur W. Caps
BY
Cumpston & Shepard
their ATTORNEYS.

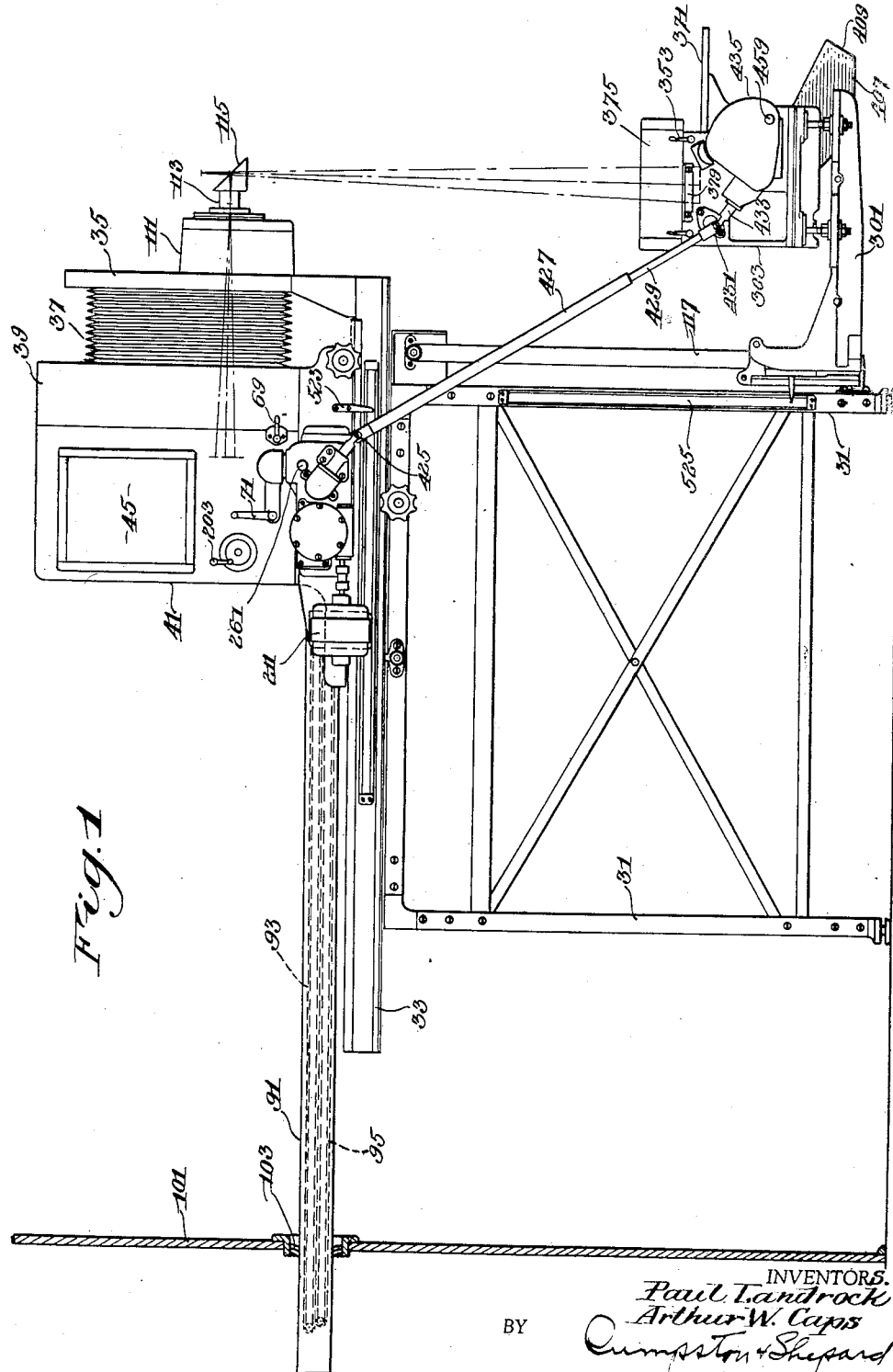

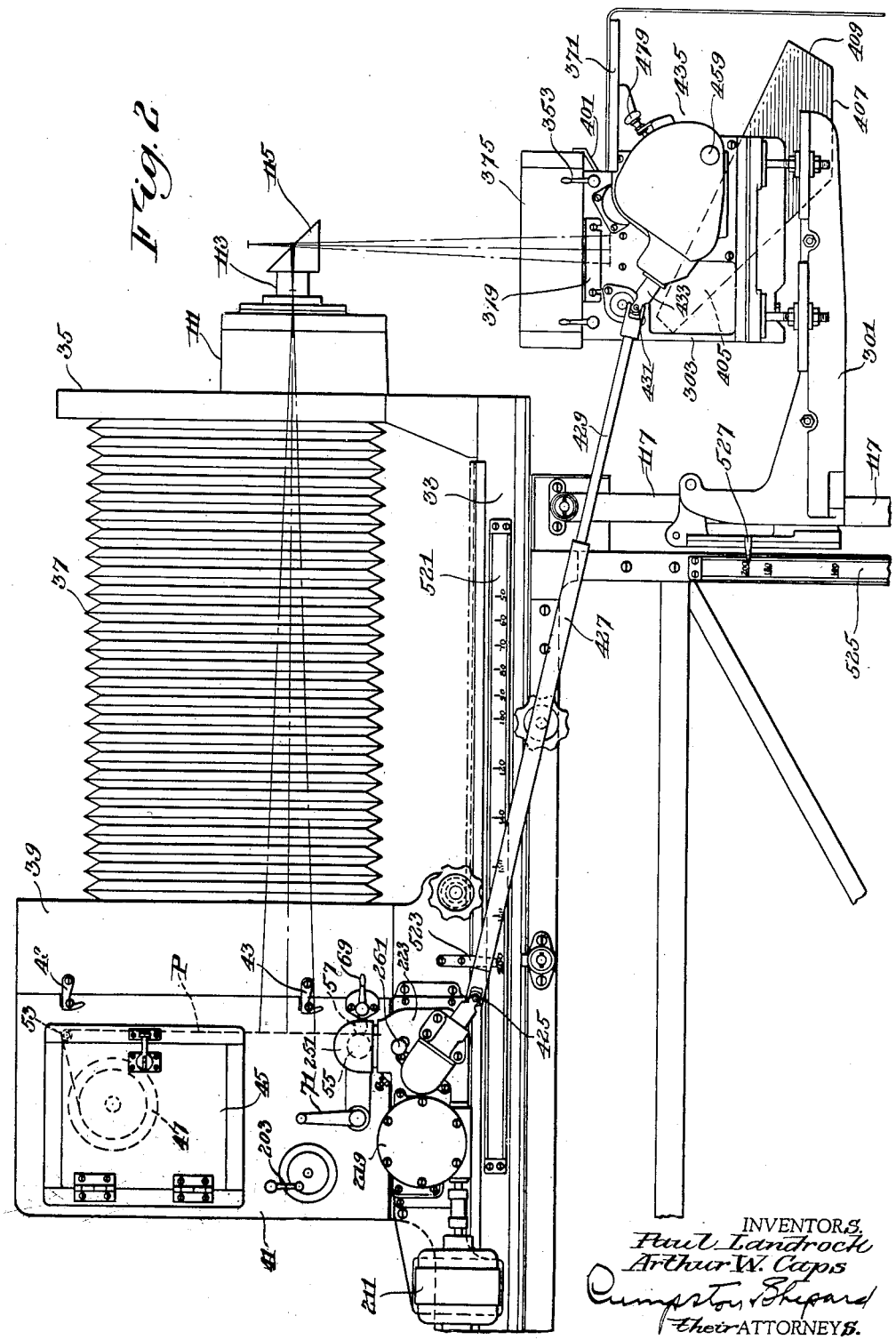

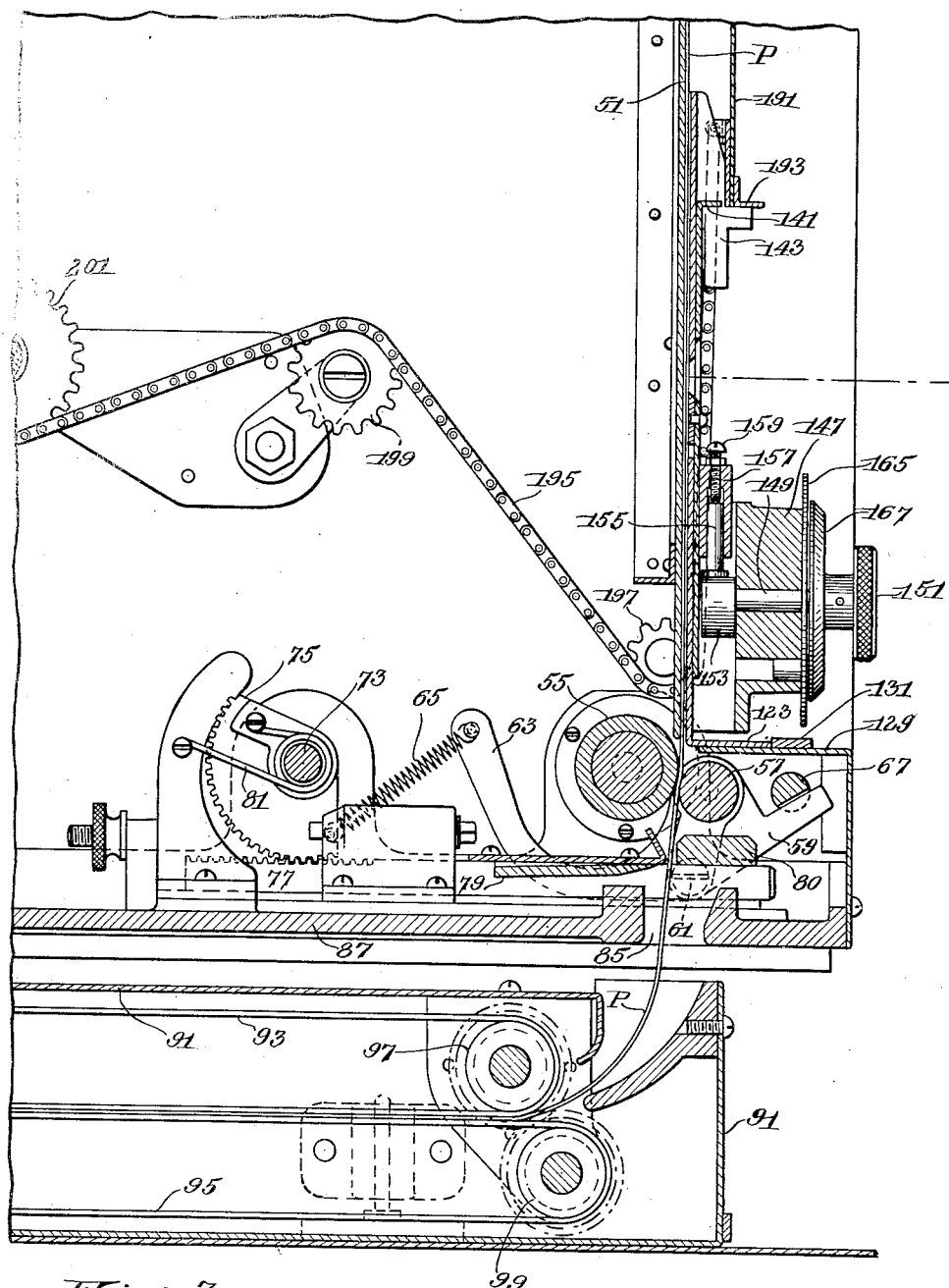

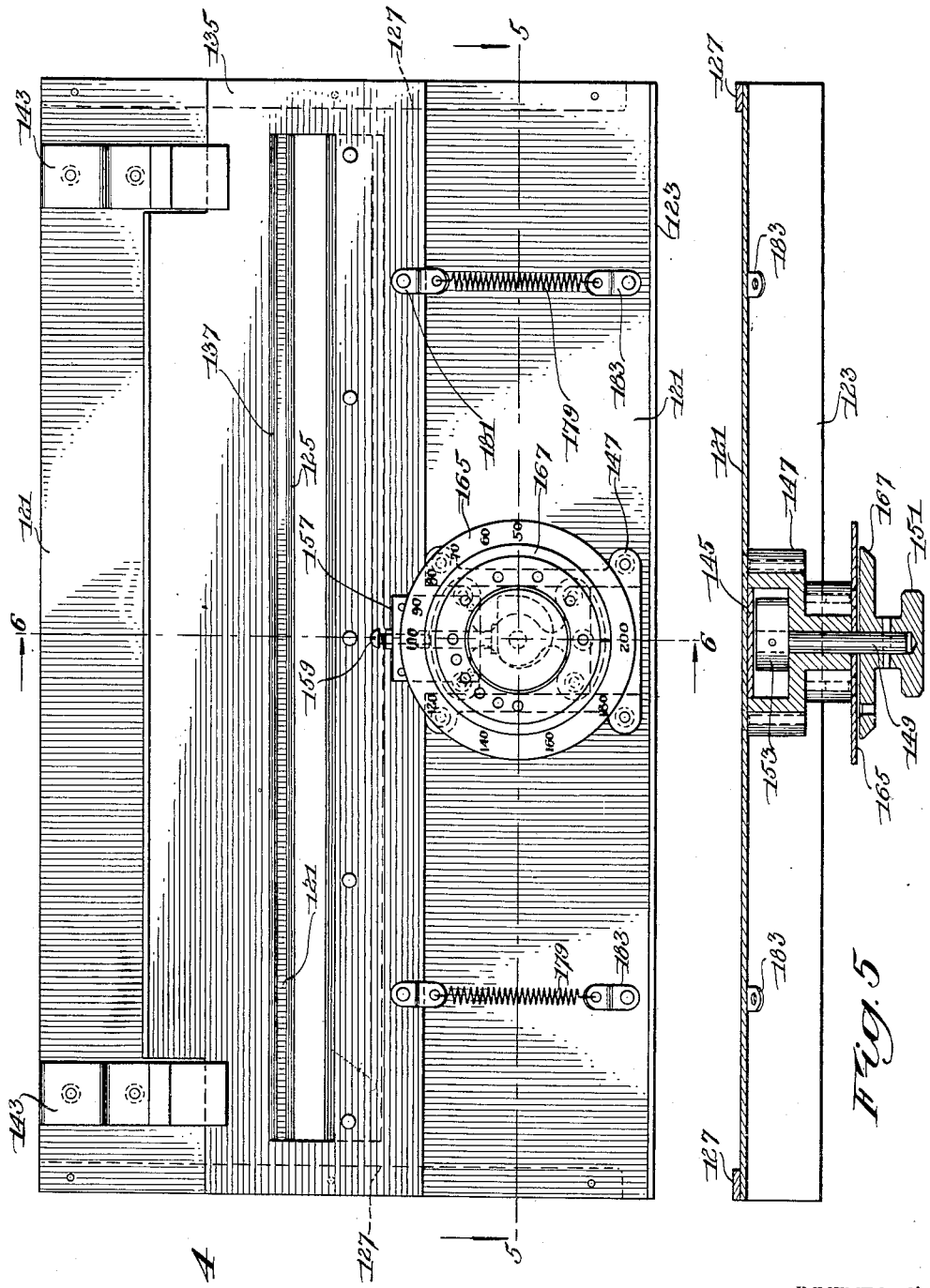

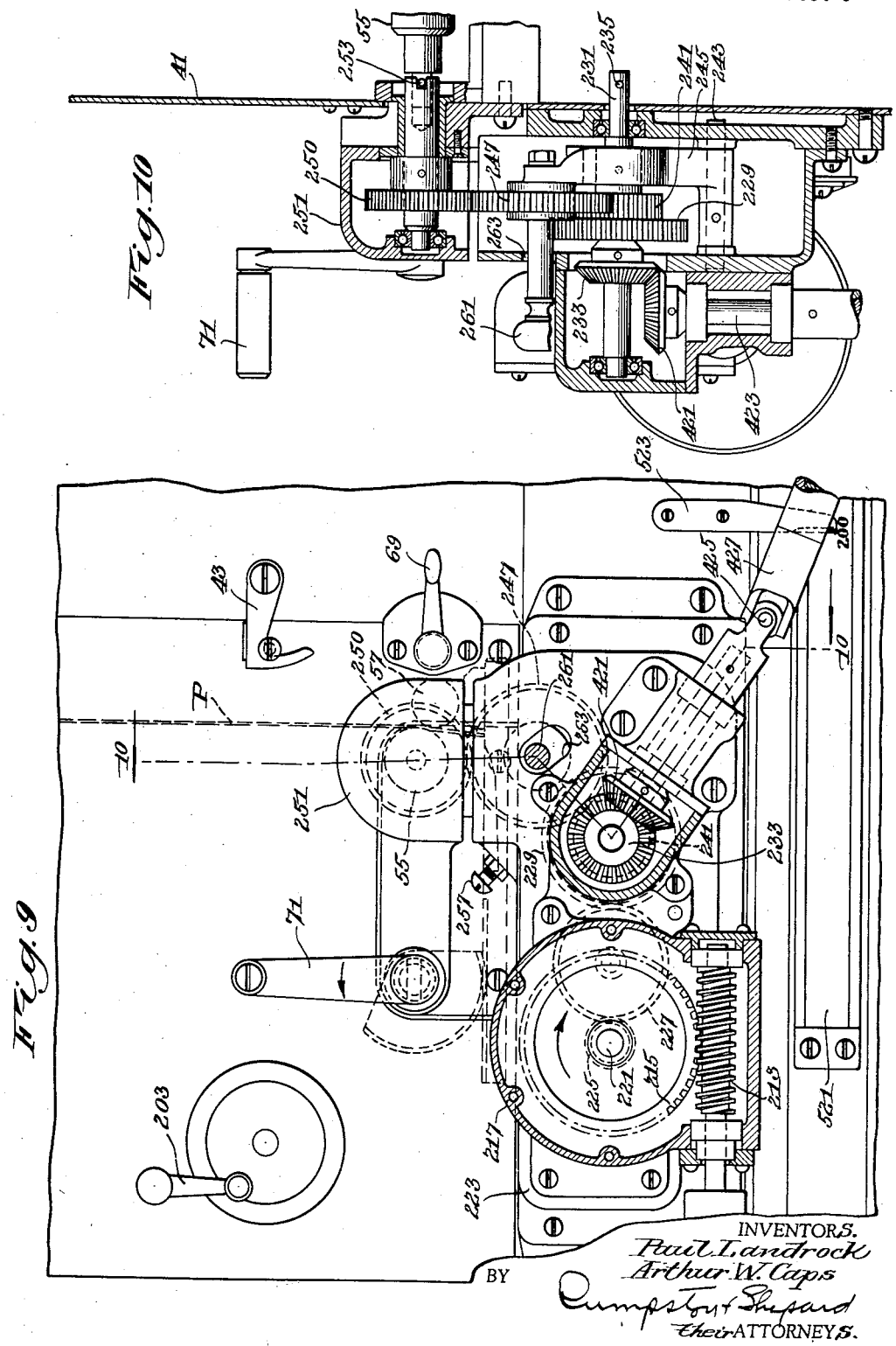

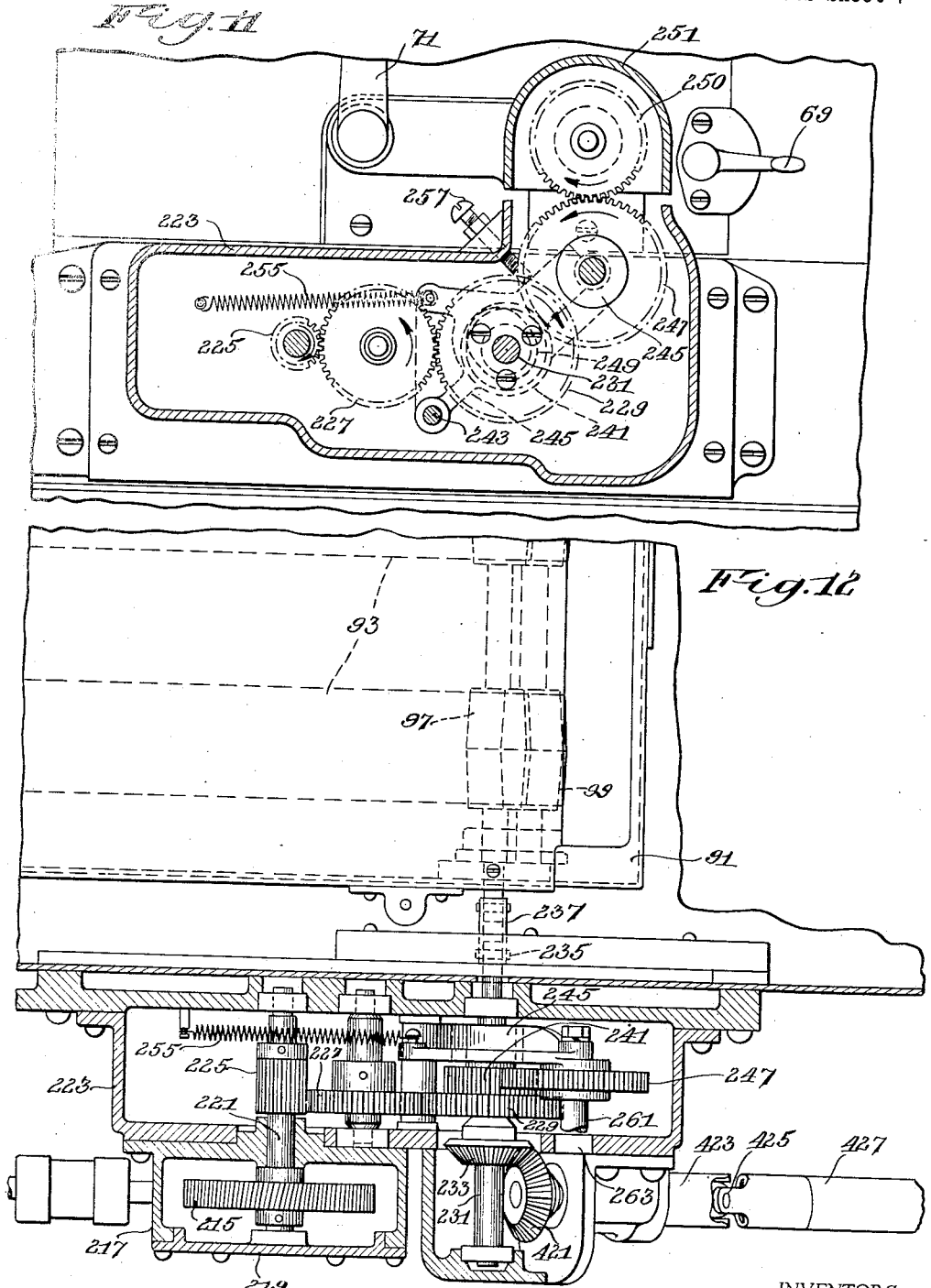

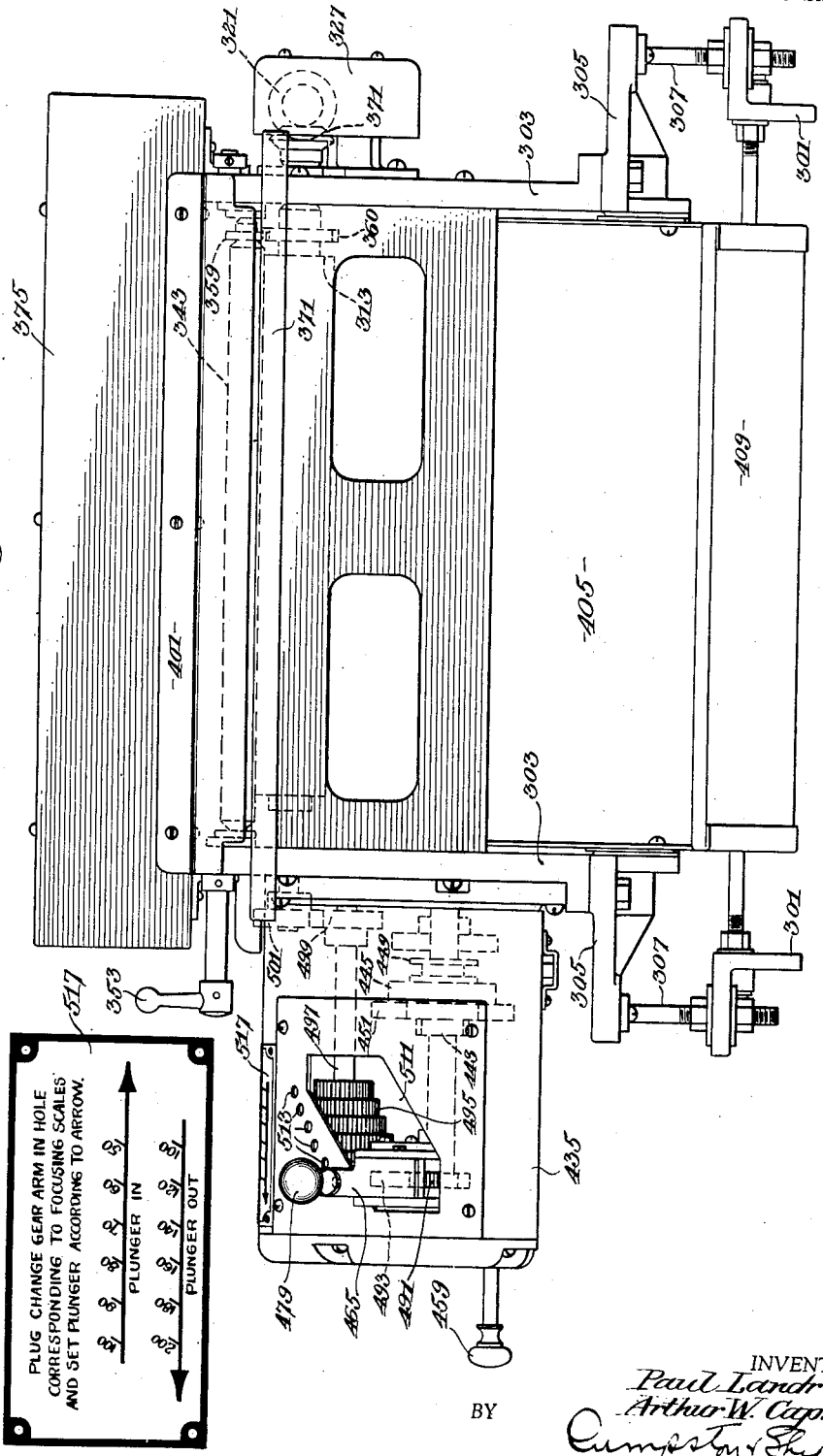

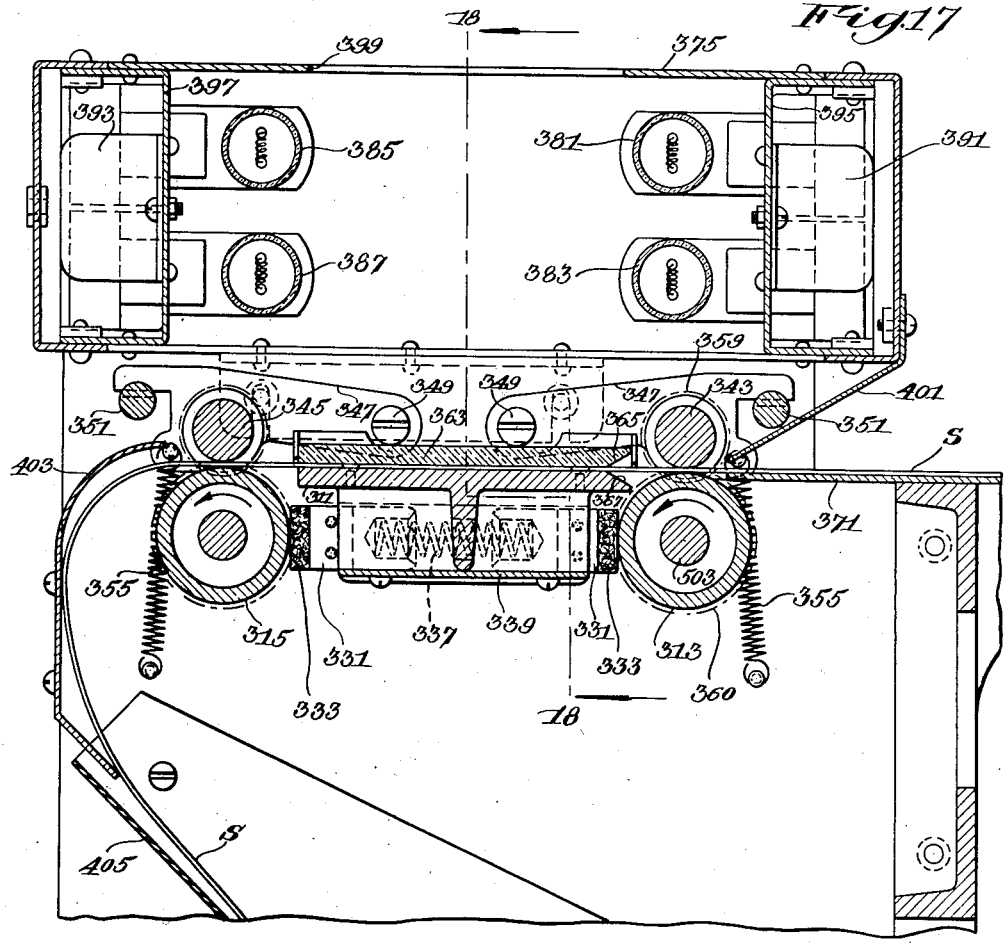
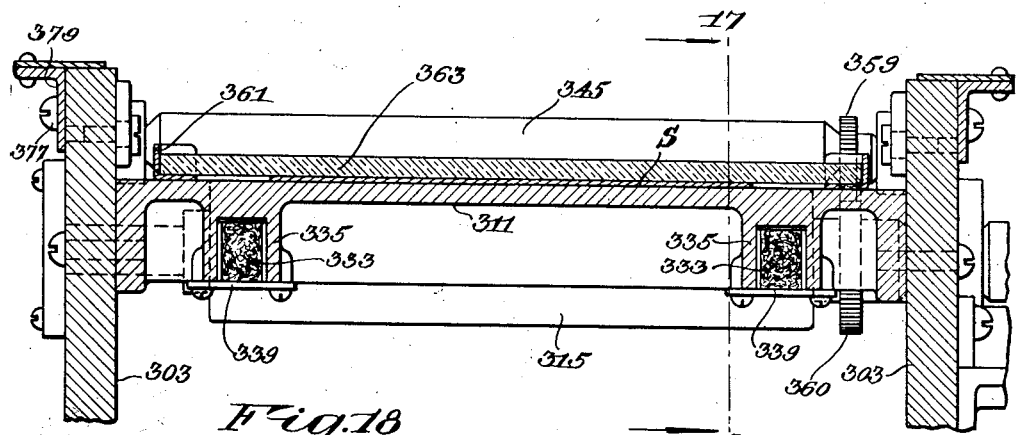

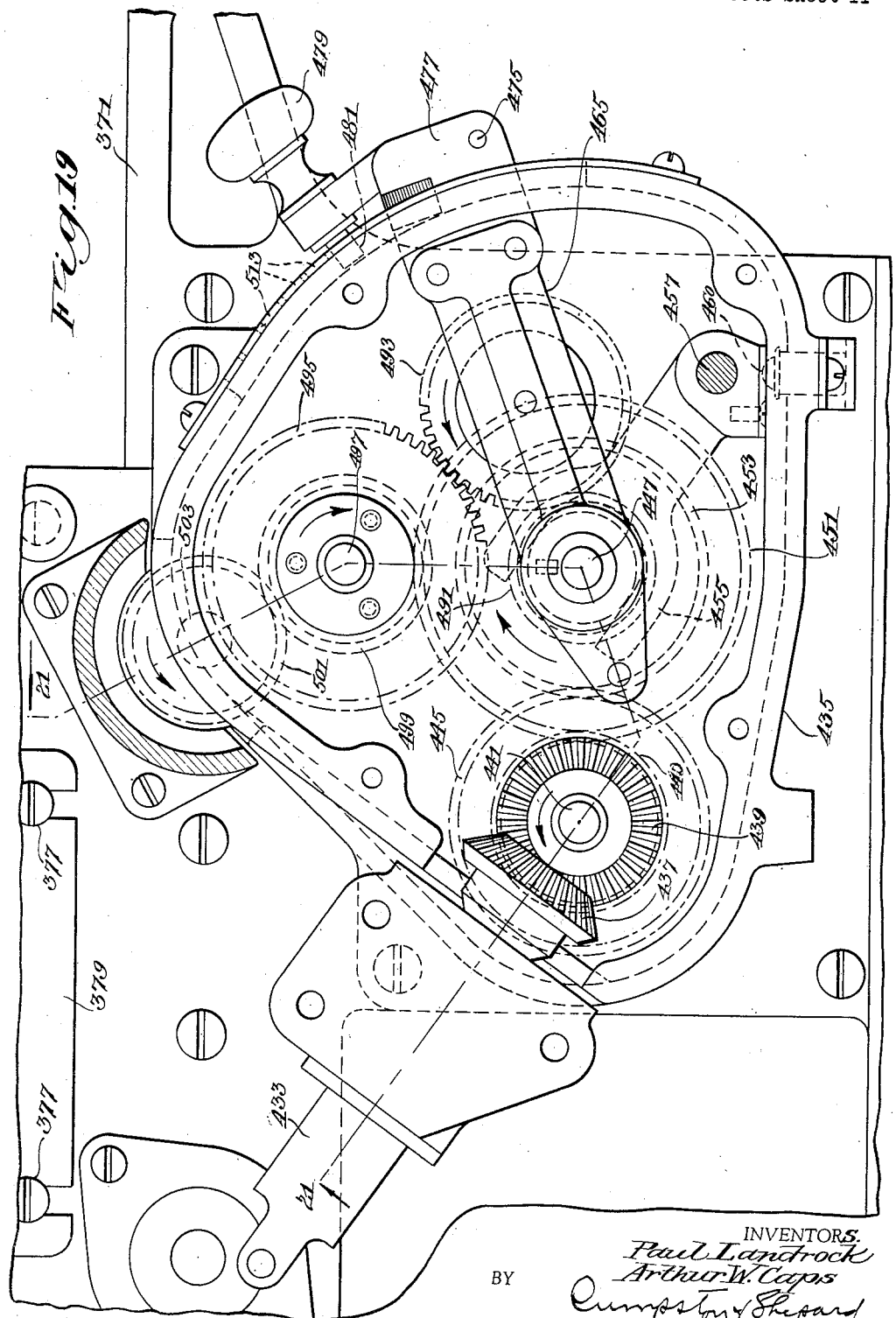

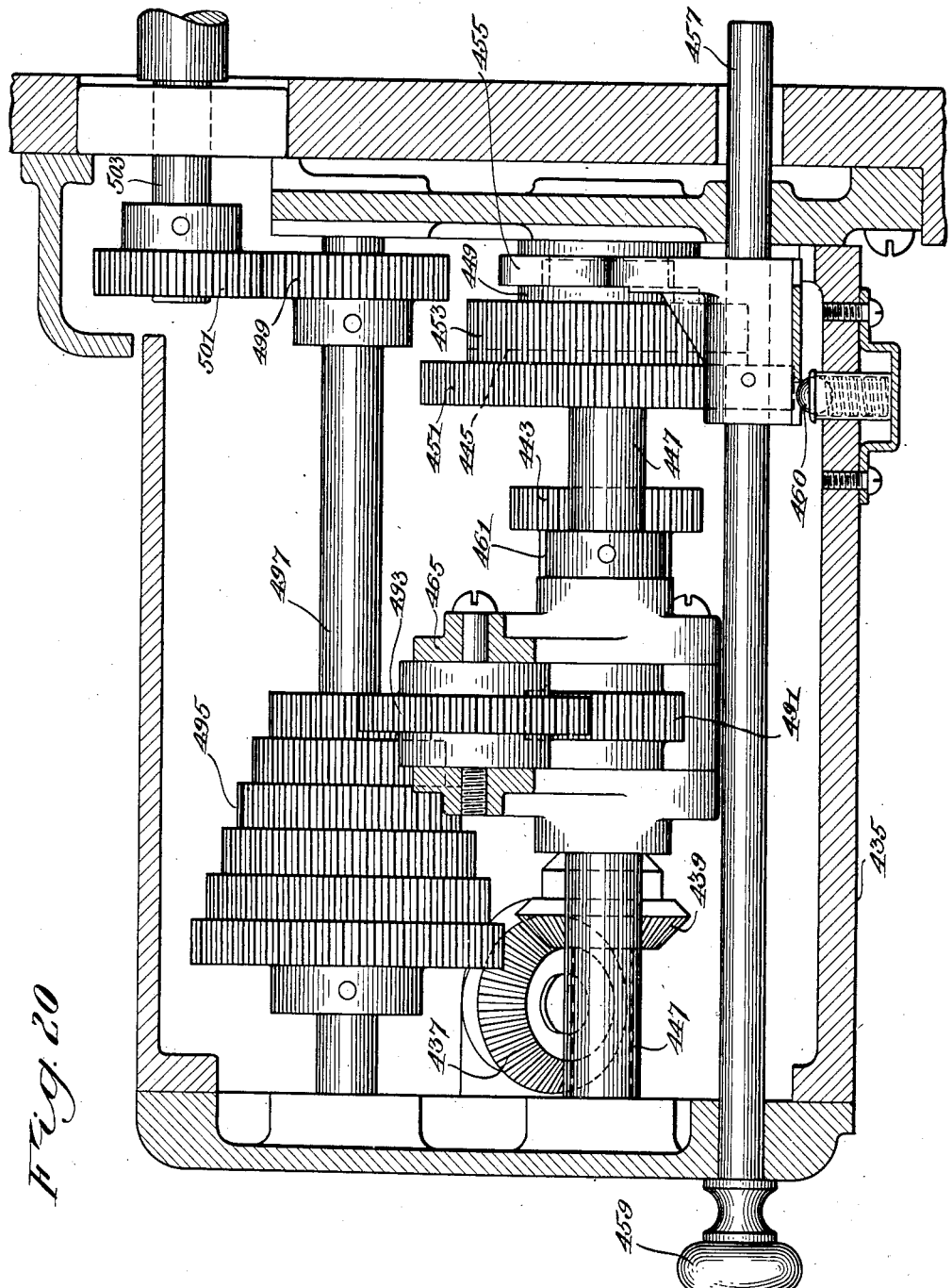

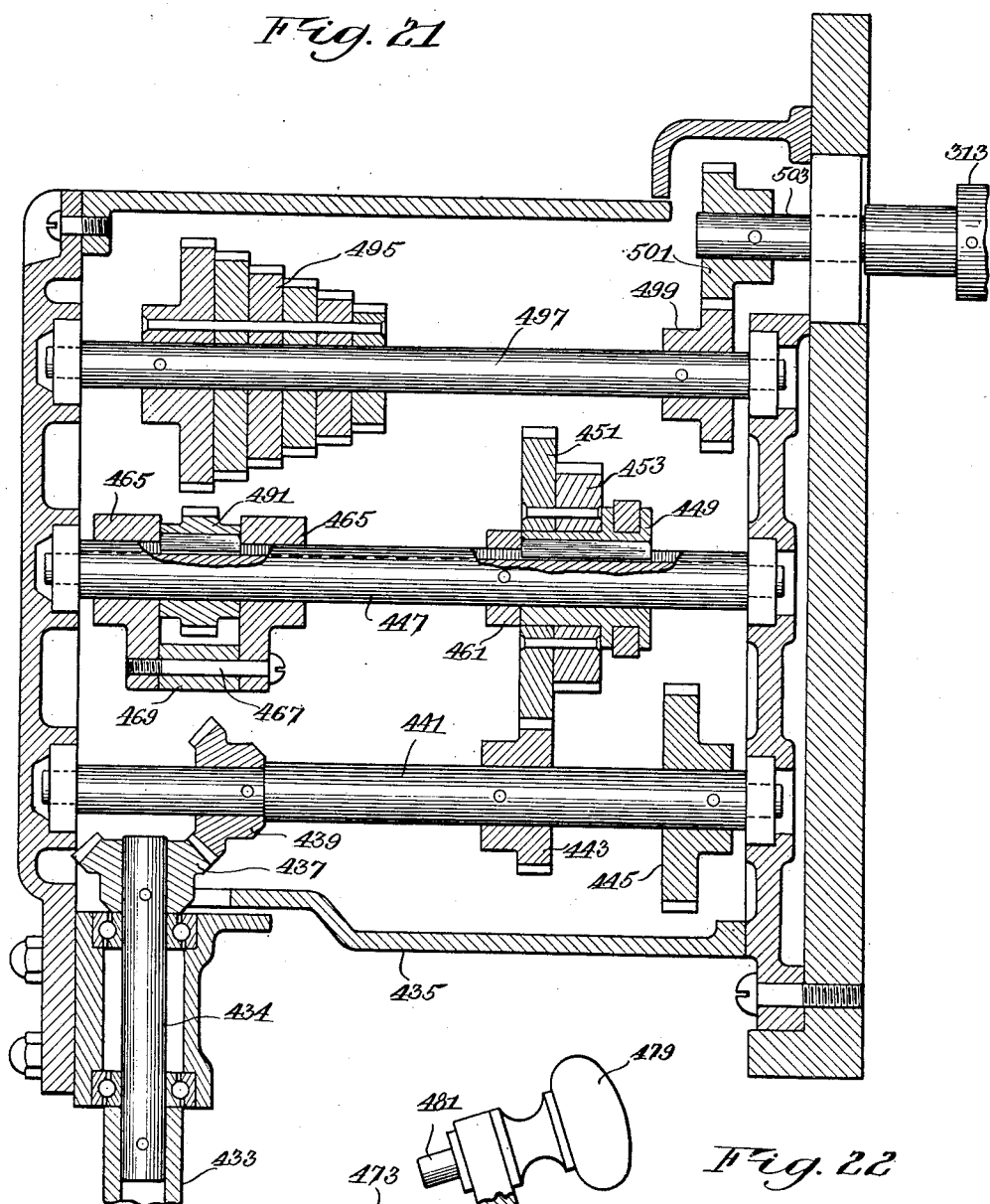
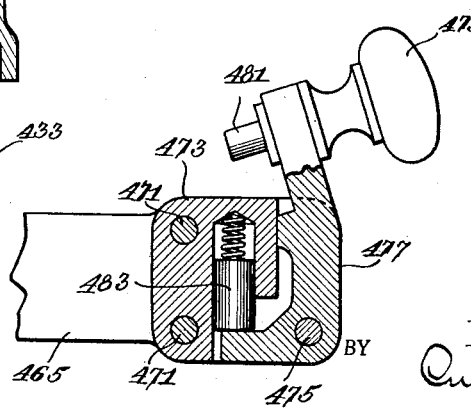

Patented Sept. 19, 1944

2,358,649

UNITED STATES PATENT OFFICE 2,358,649

PHOTOGRAPHIC COPYING APPARATUS

Paul Landrock and Arthur W. Caps, Rochester, N. Y., assignors to Photostat Corporation, Providence, R. I., a corporation of Rhode Island Application November 6, 1941, Serial No. 418,064

7 Claims. (Cl. 88—24)

This invention relates to apparatus for making photographic copies. An object of the invention is the provision of generally improved and more satisfactory apparatus capable of making copies of relatively long strips of material, such as long engineering profile drawings, oil and gas well logs, etc., frequently referred to as continuous strips.

Another object is the provision of apparatus of this type, so designed and constructed that the originals may be photographically copied either on the same scale, or on a reduced or enlarged scale, as desired.

A further object is the provision of such strip-copying mechanism in the form of an attachment which may be relatively easily and quickly applied to photographic copying cameras of a kind already in widespread use.

To these and other ends the invention resides in certain improvements and combinations of parts, all as will be hereinafter more fully described, the novel features being pointed out in the claims at the end of the specification.

In the drawings:

Fig. 1 is a side elevation of photographic copying apparatus in accordance with a preferred embodiment of the present invention, the parts being shown in the position for making a copy of the original on a reduced scale;

Fig. 2 is a similar side elevation of part of the structure shown in Fig. 1, on a larger scale, illustrating the parts in position for making an enlarged reproduction of the original;

Fig. 3 is a vertical longitudinal section taken substantially centrally through a portion of the camera body, illustrating mechanism associated with the lower part of the focal plane of the camera;

Fig. 4 is a front face view of a focal plane masking unit forming part of the invention;

Fig. 5 is a horizontal section taken substantially on the line 5—5 of Fig. 4;

Fig. 6 is a vertical section taken substantially on the line 6—6 of Fig. 4;

Fig. 7 is a vertical section taken substantially on the line 7—7 of Fig. 6;

Fig. 8 is a vertical section taken substantially on the line 8—8 of Fig. 6;

Fig. 9 is an elevation of a portion of the lower right hand side of the camera body, illustrating part of the motor driving connections with certain cover plates removed, parts cut away, and parts in section, in order to illustrate the construction better;

Fig. 10 is a developed sectional view taken approximately on the line 10—10 of Fig. 9;

Fig. 11 is an elevation of a portion of the gearing shown in Fig. 9, with overlying parts omitted to show the construction better;

Fig. 12 is a plan view of the gearing shown in Fig. 9, with the casing parts in horizontal section;

Fig. 15 is a front elevational view of the mechanism shown in Fig. 13;

Fig. 16 is a face view of an indicia plate constituting part of the mechanism shown in Figs. 13 to 15;

Fig. 17 is a vertical section taken approximately centrally through the upper part of the mechanism shown in Figs. 13 to 15, the plane of the section being indicated in part by the line 17—17 of Fig. 18;

Fig. 18 is a vertical section taken transversely through part of the mechanism shown in Fig. 17, approximately on the line 18—18 thereof;

Fig. 19 is a side elevation, on a larger scale, of the gear box shown in Fig. 13, with the cover removed to show the gears within the box, and with parts in section;

Fig. 20 is a front elevational view of the gears within the gear box of Fig. 19, with the casing shown in vertical section;

Fig. 21 is a developed sectional view through the gears, taken approximately on the line 21—21 of Fig. 19, and Fig. 22 is a side view, with parts in vertical section, of a shifting and locking knob for controlling the gearing shown in Figs. 19 to 21.

The same reference numerals throughout the several views indicate the same parts.

Figure 13:
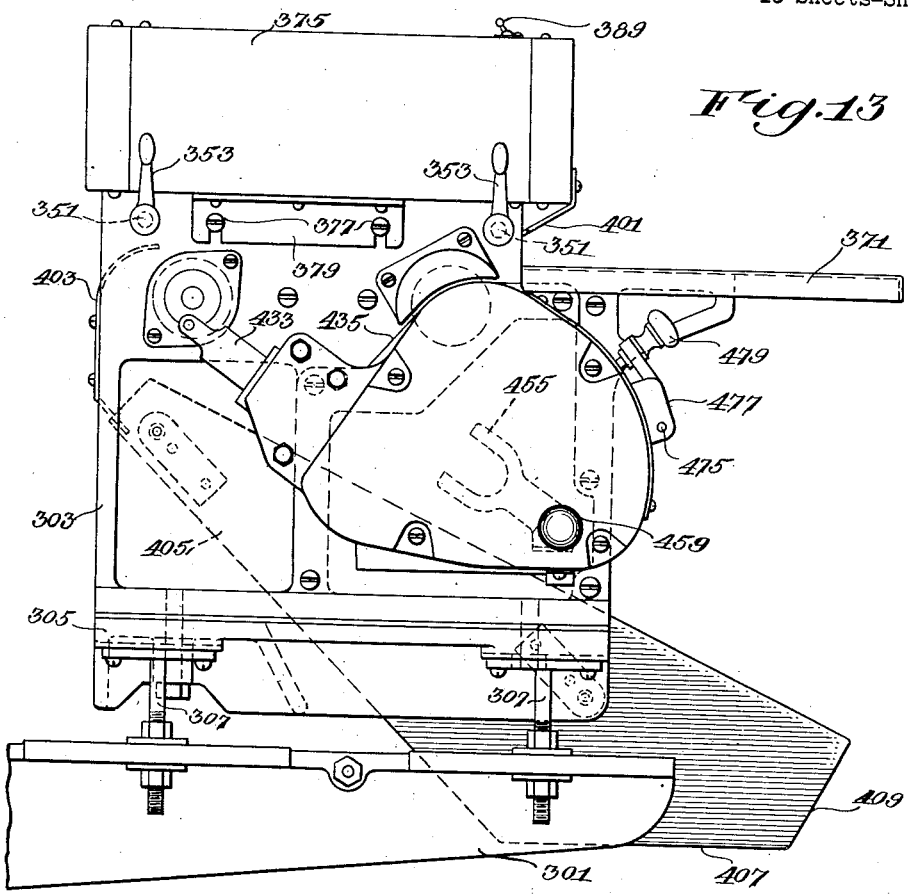
Fig. 13 is a side elevation, viewed from the right hand side, of the part of the apparatus for holding and feeding the long strip of material which is to be copied.

Many of the parts of the photocopying apparatus of the present invention may, for the sake of manufacturing economy, be of the same construction as corresponding parts of one type of copying camera already extensively manufactured and in wide use. These conventional parts of the present apparatus will first be described.

Referring now to Figs. 1 and 2 of the drawings, the conventional parts of the structure may include, for example, a suitable supporting framework having uprights 31 supporting a top rail 33 at the front end of which a camera front board 35 is mounted, the front board being connected by bellows 37 with a camera body section 39 movable back and forth along the horizontal rails 33 for purposes of focusing. Hinged to the body section 39 on the left hand side of the camera (the far or hidden side when viewed as in Figs. 1 and 2) is a magazine section 41 which fits tightly against the back of the section 39 when it is closed, and which may be held in such closed position by the latches 43.

When these latches are released, the magazine section 41 can be swung back to obtain access to the interior of the camera body. The right hand side wall of the magazine section 41 has a hinged door 45 which may be opened to obtain access to a supply roll 47 of sensitized film, such as paper coated with photographic emulsion.

Within the magazine section 41, near the front thereof, is a vertical plate 51 (Fig. 3) extending transversely of the machine and constituting a focal plane support. The web or film from the roll 47 is led over a guide roller 53 (Fig. 2) at the top of the focal plane support and thence extends downwardly, lying flat against the front face of the focal plane support in the position (Figs. 2 and 3) indicated by the letter P. Below the bottom edge of the focal plane support the paper passes through the nip between a pair of feed rollers, such as the roller 55 (Fig. 3) which may be driven for feeding purposes, and the roller 57 which serves to press the paper against the roller 55 and which may be geared to the roller 55 to be driven positively therewith. The idler roller is mounted in bearings on a pair of bracket levers 59 pivoted to oscillate on screw studs 61, and having tails 63 constantly pulled by tension springs 65 to tend to press the idler roller against the feeding roller. When it is desired to relieve the roller pressure for purposes of threading or withdrawing the strip of sensitized paper, or to stop the feeding motion thereof, a transverse shaft 67 (Fig. 3) having flat spots opposite the bracket levers 59 may be turned a fraction of a revolution by means of the accessible handle 69 (Fig. 2) to shift the bracket levers 59 to move the roller 57 away from the roller 55. Conventionally, a one-way clutch is associated with the feeding roller 55 to prevent reverse rotation thereof, but such clutch is omitted in the present instance, as is also the conventional hand winding crank and associated measuring device for winding measured lengths of film.

When the strip of paper P is to be severed, a crank handle 71 (Fig. 2) is turned in a counter-clockwise direction, which causes corresponding turning of the shaft 73 (Fig. 3) on which this handle is mounted, turning a pair of gears 75 fixed to this shaft and causing forward movement of a pair of rack bars 77 to advance a severing knife 79 mounted on these rack bars into shearing relation to a fixed bar 80, to cut the paper P transversely in a line slightly below the feeding rollers 55, 57. A spring 81 associated with the shaft 73 constantly tends to return the severing knife 79 to its rearward position, out of the path of travel of the paper.

The paper P, whether severed into relatively short pieces or whether remaining in a single long strip, passes downwardly and outwardly through a transverse slot 85 (Fig. 3) in the bottom wall 87 of the camera magazine section 41, and thence directly or indirectly into suitable photographic developing apparatus of known form. In the present instance the paper preferably does not pass directly into a developing bath, but goes into a conveyor casing 91 (Figs. 1 and 3) and is received between one or more upper belts 93 and one or more lower belts 95, running on upper rollers 97 and lower rollers 99, respectively. Movement of these belts carries the sensitized paper rearwardly into a photographic dark room, one wall of which is indicated diagrammatically at 101, the conveyor 91 entering the dark room through a light seal 103 which permits the conveyor 91 to move longitudinally through the opening in the dark room wall, when the camera body is moved along the rails 33 for focusing, while maintaining a light-tight joint at all times. Within the photographic dark room, the sensitized paper may be developed, washed, and fixed in the usual manner, by hand or by the use of any desired apparatus or machinery.

On the camera front board 35 is mounted a casing 111 of the same kind as that which, in conventional cameras of similar construction, contains a photographic shutter. No shutter is necessary in the apparatus of the present invention, however, and the shutter is preferably omitted. On the front of the housing 111 is secured a housing 113 containing a suitable lens or lens system, to which is attached a casing 115 containing a prism or other light reflecting means, faced downwardly to receive light rays rising approximately vertically from a suitable copyholder holding the document or other subject to be copied, this copyholder being supported for vertical focusing movement on a pair of vertical rails 117 mounted at the front end of the supporting framework 31.

The apparatus thus far described is conventional and well known (except for the omission of the one-way clutch, the feeding and measuring mechanism, and the camera shutter, as above mentioned) and further detailed description thereof is believed to be unnecessary.

The further structure of the present invention can best be understood by appreciating the principle of operation. According to this principle, the strip of material to be photographically copied (such for example as a long engineering profile, an oil well log, or the like, although short strips, individual letters, etc., can likewise be copied) is fed longitudinally at a constant rate, past a given area, and this area of the moving strip is illuminated. Light rays from the illuminated area pass to the prism in the casing 115, thence through the lens system in the casing 113, into the camera body, and fall upon the sensitized film strip or web P in the camera body, which strip or web is fed through the focal plane at a constant rate, in synchronism with the movement of the image of the subject to be copied. All but a narrow transverse strip or area of the moving paper web P is masked off, so that the image of the illuminated area of the moving subject falls only upon the narrow unmasked area of the moving sensitized material. Since the two strips are moving in synchronism, the movement does not cause blurring or fogging of the image, because the image of any given point on the moving subject travels on the focal plane of the camera at exactly the same speed at which the sensitized material in the focal plane is moving. A single photographic print of any desired length may thus be made, so long as the subject and the sensitized paper continue to be fed in proper synchronism with each other.

If it is desired to make the photographic reproduction of the same size or scale as the original subject, then the distance from the lens system to the subject should be equal to the distance from the lens system to the sensitized material in the focal plane of the camera, and the rate of feeding travel of the subject should be equal to the rate of feeding travel of the sensitized material. If the photographic copy is to be made on a reduced scale, then the distance from the lens system to the subject must be greater than the distance from the lens system to the sensitized material, the proportions between these distances being governed by the focal length of the lens system and the known laws of optics, and the feeding movement of the subject must take place at a faster rate than that of the sensitized material, the ratio of feeding rates being the same as the ratio of distances from the lens system to the subject and the sensitized material, respectively. The parts in Fig. 1 are shown set for making such a reproduction on a smaller scale.

On the other hand, if a reproduction is to be made on an enlarged scale, then the distance from the lens system to the subject must be less than the distance from the lens system to the sensitized material, such a setting being indicated in Fig. 2. In addition, the feeding movement of the subject must take place at a slower rate than the feeding movement of the sensitized material.

The structural parts of the present invention may conveniently be divided into four main groups: First, the focal plane masking parts, to mask all but the desired limited area of the moving strip of sensitized material; second, the driving mechanism for the sensitized material; third, the subject holding mechanism, for holding and illuminating the subject to be copied; and fourth, the subject driving mechanism, for driving or advancing the subject to be copied. The description of the structure will be subdivided under these four headings for convenience of reference.

*Focal plane masking parts*

As above indicated, only a small part of the focal plane area of the camera is used when making "continuous strip" reproductions, the remainder of the focal plane area being covered or masked off partly by using an adjustable masking screen of the conventional kind with which many commercial copying cameras are equipped, and partly by a special masking unit constituting part of the present invention, which can quickly and easily be placed in the camera when it is to be used for making such continuous strip copies, and removed from the camera when it is to be used in the conventional manner.

This masking unit is best shown in Figs. 4 to 8, inclusive, and comprises a vertical plate 121 having a forwardly extending horizontal flange 123 at its bottom edge, and a horizontal slot 125 extending almost the full width of the plate 121 but stopping somewhat short of the extreme lateral edges of the plate. A pair of narrow strips of material 127 are secured to the rear face of the plate 121 at the lateral vertical edges thereof, these strips being slightly thicker than the thickness of the film web P. The plate 121 is inserted in the camera body (after releasing the latches 43 and swinging the magazine section 41 to an open position) by placing it against the front face of the focal plane support 51, with the bottom flange 123 resting on a transverse shelf 129 in the magazine section of the camera body, as shown in Fig. 3, and held against forward displacement by a transverse strip 131 secured to the top of the shelf 129. In this position, the strips 127 rest against the front face of the focal plane support 51 and serve to hold the remainder of the area of the plate 121 spaced slightly forwardly from the focal plane support, the film strip P extending downwardly through such space between the focal plane support 51 and the plate 121.

It is desirable to be able to adjust the width of the slot in the plate 121 through which the exposure is made. To effect such control, a plate 135 of smaller area than the plate 121 overlies a part of the front face of the latter immediately adjacent the slot 125, and is movable vertically over the plate 121. The plate 135 has a slot 137 corresponding in general to the slot 125, but narrower than the latter in a vertical direction. On the rear face of the plate 135 at the bottom edge of the slot 137, is secured a narrow transverse strip 139 (Fig. 6) having the same thickness as the plate 121, so that the rear surface of the strip 139 lies in the same plane with the rear surface of the plate 121, both of such rear surfaces being substantially in contact with the front face of the film strip P, to provide sharp and well-defined upper and lower edges of the effective exposure slot. The upper edge of the movable plate 135 has a forwardly extending strengthening flange 141 throughout most of its length, the flange being cut away at the extreme ends of the plate 135. Where this flange is cut away, the upper edge of the plate lies behind downwardly extending lugs of a pair of brackets 143 fixed to the front face of the plate 121, which brackets serve to hold the upper part of the movable plate 135 against the front face of the plate 121 while permitting upward and downward sliding movement. The side edges of the cut away parts of the plate 135 lie closely adjacent the inner side faces of the brackets 143 to prevent substantial lateral movement of the plate. The lower part of the plate 135 is guided by means of a wide downwardly extending tongue 145 integral with and in the plane of the plate 135, which tongue extends into the hollow space within a bracket 147 fixed to the front face of the plate 121, the lateral edges of the tongue 145 slidingly engaging the vertical lateral edges of the bracket as seen in Figs. 5 and 7.

Rotatably mounted in the bracket 147 is a shaft 149, to the front end of which is pinned a knob 151, and to the rear end of which is pinned a cam 153 which cooperates with a cam follower 155 adjustable with respect to the plate 135. Conveniently the cam follower 155 is formed by a shank adjustable vertically in a socket in a member 157 fixed to the front face of the plate 135, adjustability being secured by turning the screw 159, provided with a lock nut 161. The front face of the member 157 lies closely adjacent a rearwardly faced surface of the bracket 147, as shown in Fig. 6, thus holding the lower part of the plate 135 against forward displacement away from the plate 121.

Secured to the front face of the bracket 147, between it and the knob 151, is a dial plate 165 suitably graduated, as shown in Fig. 4, for cooperation with an index mark on the disk 167 forming part of the knob 151. Conveniently, the graduations on the dial plate run from 50 to 200, and represent percentages of size of the copy to be made, compared with the size of the subject being copied, so that if the copy is to be half the size of the original, the knob is turned to bring the index mark opposite the numeral 50, and for equal size reproductions, the index is set at the numeral 100, and so on.

To hold the control knob 151 against creeping from the position in which it is set, the bracket 147 is provided with a bore 171 in which is placed a spring-pressed ball assembly 173 including a ball 175 constantly pressed outwardly into engagement with the rear face of the disk 167 provided with a series of openings 177 so arranged that one of such openings lies directly behind the ball 175 whenever the knob 151 is set with the index mark opposite any one of the graduations on the scale plate 165. The seating of the ball in one of the openings provides sufficient resistance to hold the knob against accidental turning due to vibration, but does not interfere with intended turning by manual force applied to the knob.

Coiled tension springs 179 (Fig. 4) have their upper ends secured to brackets 181 near the bottom edge of the plate 135, and their lower ends secured to brackets 183 fixed to the plate 121 near its bottom edge, and thus constantly pull downwardly on the plate 135 to keep the cam follower 155 in contact with the cam 153.

The adjustment of the cam 153, by the knob 151, raises or lowers the plate 135 to overlap more or less of the width of the slot 125 in the plate 121, thus varying the effective width of the exposure slot. Preferably the cam 153 is so designed as to have a uniform rise for equal amounts of rotation, being what is often called a "uniformly accelerated" cam, and the percentage graduations on the dial plate are spaced to give equal angles of rotation for equal changes in percentage. With this arrangement, the cam rise in turning through the 20% from, say, 180% to 160%, is the same as the rise in turning through any other 20% from, say, 70% to 50%. Hence, if the width of the exposure slot is a minimum at 50% setting and a maximum at 200% setting, it follows that at 100% it will have a width of the minimum plus one-third of the difference between minimum and maximum widths, and at 150% setting it will have a width of the minimum plus two-thirds of the difference. This is the preferred arrangement, and is believed to give best results, but it is not essential that the width of the slot be varied in exactly these proportions, it being within the scope of the present invention to vary the width of the exposure slot in any reasonable ratio between a maximum width for maximum percentage size of reproduction and a minimum width for minimum percentage size of reproduction.

With a lens system having an equivalent focal length of 13 inches, and with a feeding speed of travel of the film of about 2 feet per minute, and with the subject illuminated by four fluorescent tubes in the lamp housing of the subject holder described below, good results are attained by using an exposure slot varying from a minimum width of about 1/8 inch for making reproductions of 50% size, to a maximum width of about 3/8 inch for making reproductions of 200% size, these figures being given merely as a convenient illustrative example, and not as a limitation on the invention.

The variation in width of the exposure slot serves to control the exposure time, which should be increased as the percentage size of reproduction increases, assuming constant intensity of illumination of the subject. If still further variation of exposure seems desirable under any given conditions, this is preferably accomplished by adjusting the usual iris diaphragm (not shown) with which the lens system is provided, although ordinarily no adjustment of the diaphragm is required, the variation of the exposure slot being sufficient.

Fig. 4 illustrates the index mark on the disk 167 set opposite the numeral 200 on the scale plate 165, providing an exposure slot of maximum width. In Figs. 6 and 7, the parts are adjusted to a setting of 50% size, and the plate 135 is raised to its maximum extent to provide the narrowest exposure slot.

This masking unit above described is used in conjunction with the adjustable masking curtain with which many photographic copying cameras of this general type are already equipped. Such masking curtain, as well understood in the art, includes a flexible opaque curtain 191 (Fig. 3) mounted to move upwardly and downwardly in front of the focal plane support, the lower edge of the curtain having a strengthening transverse bar 193 connected thereto, and the upward and downward movements of the curtain being controlled by a pair of chains 195 at opposite sides of the camera body, running over suitable sprockets 197, 199, and 201. Movements of the chain are controlled by an accessible external crank 203 (Fig. 2) on the camera body. When the masking device above described with reference to Figs. 4 to 8 is installed in front of the focal plane, according to the present invention, then the crank 203 is turned to bring the masking curtain 191 downwardly until the bar 193 at its lower edge rests upon shoulders formed on the brackets 143, as seen in Fig. 3. In this position, the lower edge of the curtain 191 overlaps the upper edge of the masking plate 121, and the curtain 191 and the masking device of the present invention together cover and mask all of the focal plane area of the camera except the area exposed through the exposure slots 125 and 137 in the plates 121 and 135, respectively. Yet it is but the work of a moment to remove the masking mechanism from the camera, first by turning the crank 203 to raise the masking curtain 191, and then by simply lifting out the masking device shown in Figs. 4 to 8 (after opening the camera body, of course) which simply rests loosely in the camera body without being held by any screws, bolts, or similar fastenings.

*Driving mechanism for the sensitized material*

Mechanism is provided for driving the sensitized material, and also for driving the subject to be copied, both at a constant rate during the making of any given reproduction, but one or the other of these rates is variable in order to make copies of different sizes from a given original. Either the rate of driving the sensitized material or the rate of driving the subject to be copied may be varied, although it is usually preferred to drive the sensitized material at a given constant rate for all sizes of reproductions, and to vary the rate of driving the subject being copied, to produce the different sizes required.

Some parts of the driving mechanism are common to driving both the sensitized material and the subject, while other parts are concerned only with the driving of one or the other. There will now be described those parts of the driving mechanism which are common to both the sensitized material drive and the subject drive, together with those parts individual to the sensitized material drive.

Reference is made to Figs. 2, and 9 to 12, inclusive. Mounted on the right hand side of the camera body, a little to the rear of the magazine section 41, is a small electric motor 211, the armature shaft of which is connected directly to the shaft of a worm 213 driving a worm gear 215 (Figs. 9 and 12) in a gear box 217 having a removable front cover 219. The shaft 221 of the worm gear 215 extends through the rear wall of the gear box 217, into a second gear box 223, within which this shaft 221 carries a pinion 225 meshing with an idler gear 227 which, in turn, drives a gear 229 on a shaft 231. An outward extension on this shaft 231 carries a beveled gear 233 which serves to drive the subject being copied, such drive from the gear 233 onward being described below, under the heading "Subject driving mechanism." An inward extension of the same shaft 231 is provided with a coupling pin 235 (Figs. 10 and 12) engaging a suitable coupling sleeve 237 by which this shaft is coupled to the shaft of the upper rollers 97 of the conveyor belts 93 and 95, thus driving the conveyor system to carry the exposed film to the dark room.

Also mounted on the shaft 231, alongside the gear 229, is a gear 241 from which the feed roller 55 (Fig. 3) of the sensitized material is driven, to cause the sensitized material to be continuously advanced during the making of a "continuous strip" reproduction. The drive between the gear 241 and the feed roller 55 is such that the magazine section 41 of the camera body, in which the roller 55 is mounted, may readily be opened and closed as required, without difficulty and without damage to the drive.

To permit such opening and closing, there is provided in the gear box 223 a cross shaft 243 on which is swingingly mounted a bracket 245 carrying a gear 247 meshing with the gear 241. This bracket 245 has a large opening 249 through which the shaft 231 passes, with considerable play, so that the bracket 245 may swing to a substantial extent around its pivot 243, notwithstanding the shaft 231. By swinging the bracket 245 on its pivot 243, the gear 247, while remaining in mesh with the gear 241, may be swung downwardly out of or upwardly into mesh with a gear 250 mounted in a gear box 251 on the magazine section 41 of the camera body, in a position in alinement with the feeding roller 55. A suitable coupling connection such as the pin and slot connection indicated in general at 253 (Fig. 10) connects the shaft of the gear 250 to the shaft of the feeding roller 55, driving the latter from the former.

A tension spring 255 (Fig. 11) connected at one end to a fixed stud and at the other end to an arm on the bracket 245, constantly tends to swing this bracket in a counterclockwise direction about its pivot 243, to hold the gear 247 in meshing engagement with the gear 250. The uppermost position of the bracket is controlled by an adjustable stop screw 257 provided with a locking nut. A handle 261 (Figs. 2, 9, 10, and 12) extends outwardly from the upper end of the bracket 245, through a suitable opening 263 in the gear box 223, to a position where it may be grasped. Downward pressure on this handle 261 swings the bracket against the tension of the spring 255, unmeshing the gear 247 from the gear 249 to insure non-interference with opening or closing movements of the magazine section 41 of the camera body. In most cases, however, it is not necessary to depress the handle 261 when opening or closing the magazine section, for the elimination of any one-way clutch brake on the feeding roller 55 permits this roller to rotate slightly as required, in one direction or the other, when the gear 250 unmeshes from or meshes with the gear 247 during opening or closing movements.

*Subject holding mechanism*

Figure 14:
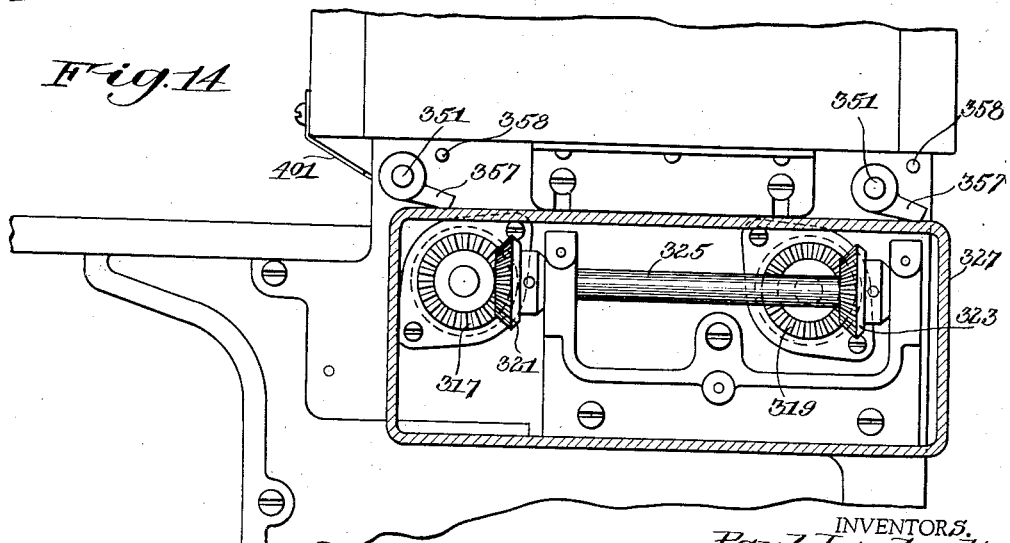
Fig. 14 is a similar elevation of a fragment of the structure shown in Fig. 13, viewed from the opposite or left side, with part of the gear casing removed and part shown in section.

In place of the usual copyholder or subject holder customarily mounted for upward and downward focusing movement on the rails 117 (Figs. 1 and 2) there is used a special subject holding and feeding mechanism mounted on a bracket 301 (Figs. 1 and 2) similar to the bracket supporting the conventional copyholder, and likewise adapted to travel upwardly and downwardly along the rails 117. Referring now to Figs. 13 and 15, the mechanism includes a pair of side frames 303 supported by laterally extending feet or brackets 305 secured by adjustable levelling screws 307 to the main supporting brackets 301. Extending transversely between these frames 303 is a plate 311 forming the base on which the subject to be copied rests at the moment of exposure. Immediately in front of and behind this plate 311 are feed rollers 313 and 315, respectively, on shafts journalled in the side frames 303. The left ends of both of these shafts extend through the left hand side frame and are provided, exteriorly thereof, with bevel gears 317 and 319, respectively (Figs. 14) meshing with bevel gears 321 and 323, respectively, both fixed to a longitudinal shaft 325. Hence the two feed rollers 313 and 315 turn at equal speeds, when one of them is driven. A gear box 327 (Figs. 14 and 15) encloses the gears 317 to 323, inclusive, and the shaft 325.

Frictional brakes engage the feeding rollers 313 and 315 to eliminate the effect of backlash in the driving gearing, so that the subject will be driven smoothly at a constant rate. The frictional brakes are best seen from Figs. 17 and 18, and comprise one or two pairs of brake shoes 331 each having a face or lining 333 of felt or other soft friction material. Two pairs of brake shoes are here illustrated, but one pair may be omitted if desired. The brake shoes are mounted for longitudinal movement in grooves formed between ribs 335 on the underside of the plate 311, one pair of shoes being mounted between the two rollers 313 and 315 near the right hand ends of such rollers, the other pair being similarly mounted near the left hand ends of such rollers. The two shoes constituting each pair are constantly urged away from each other by a coiled spring 337 interposed between the two shoes of the pair, the spring pressure serving to keep the soft faces 331 in engagement with the rollers 313 and 315 to apply a slight frictional brake to the rotation of such rollers to eliminate the backlash effect. Cover plates 339 close the lower sides of the slots in which the shoes are mounted, holding them in place.

Pressure rollers 343 and 345 (Fig. 17) are mounted immediately above the rollers 313 and 315, respectively, being journalled in supporting levers 347 independently pivoted on studs 349. The free ends of the levers overlie flat spots on two shafts 351 journalled in the side frames 303 and provided at their right hand ends with handles 353 (Fig. 13) by which they may be turned to raise the ends of the arms 347 and thus to raise the pressure rollers 343 and 345 slightly from the rollers 313 and 315. Springs 355 tend to pull the arms 347 downwardly to maintain pressure between the sets of rollers. The left hand ends of the shafts 351 are provided with arms 357 (Fig. 14) which may engage stop pins 358 to limit rotational movement of the shafts to prevent their being turned through a complete rotation. Gears 359 at the left ends of the pressure rollers 343 and 345 mesh with gears 360 at the corresponding ends of the rollers 313 and 315, respectively, so that both the upper and lower sets of rollers are positively driven.

Between the pressure rollers 343 and 345, and above the plate 311, near opposite ends thereof, are a pair of metal frames 361 arranged horizontally, having at their lower edges inwardly extending flanges on which is supported a plate 363 of suitable transparent material such as glass. The lower front corner of the plate 363 is beveled as at 365, and the upper front corner of the base plate 311 is similarly beveled at 367, to provide a flaring mouth at the entrance to the space between the plates, to assist easy entry of the subject to be copied.

Extending forwardly from the front feeding roller 313, at the same level as the top of this roller (which is also the same level as the top surface of the plate 311) is a flat horizontal plate or shelf 371 forming a convenient support on which the subject to be copied is placed prior to feeding it through the rollers and between the plates 311 and 363. Lateral guides (not shown) are preferably mounted adjustably on this shelf 371 to guide the edges of the subject as it is fed rearwardly into the rollers. The position of the subject being copied, in passing over the shelf 371 and between the feeding rollers, is indicated at S in Fig. 17.

A lamp housing indicated in general at 375 rests upon the top edges of the side frames 303 and is removably secured thereto by screws 377 (Figs. 13 and 18) the shanks of which extend through vertical slots in the downwardly extending webs 379 of angle bars riveted to the bottom of the lamp housing. By slightly loosening the screws 377 without removing them completely, the entire lamp housing can be lifted off of the top of the side frames 303, for inspection or replacement of the illuminating means.

Within the lamp housing is any suitable illuminating means for illuminating the subject to be copied, as it passes under the transparent plate 363. The illuminating means may take the form of incandescent light bulbs or fluorescent light tubes, the latter preferably being employed. Four of such tubes are indicated at 381, 383, 385, and 387, controlled by a switch 389. The first two tubes are served by a transformer 391 and the other pair by a transformer 393. Partitions 395 and 397, respectively, form compartments within the lamp housing for containing the transformers.

The top of the lamp housing 375 is provided with an opening 399 through which the light rays from the illuminated subject pass upwardly to the camera prism. The walls surrounding this opening overlap the illuminating means so that direct light rays therefrom can not pass upwardly toward the prism.

An inclined guard plate 401 is fixed to the lower front corner of the lamp housing 375 and extends obliquely downwardly and rearwardly therefrom to a position close to the nip between the rollers 313 and 343, to deflect downwardly any upcurled advancing edge of the subject being fed into the mechanism. As the advancing edge of the subject issues from the second pair of rollers 315 and 345, it is deflected downwardly by a curved guard plate 403, into the upper end of a downwardly and forwardly extending trough 405 secured between the side frames 303, which trough terminates in a flat bottom 407 and a low front wall 409 (Fig. 13) providing an enclousre within which the subject may curl up, or may lie in whatever form (loose folds, for example) the material may naturally assume, until the entire strip has passed through the machine and is ready to be removed.

Subject driving mechanism

The feeding rollers 313 and 315 are driven as follows: The previously mentioned bevel gear 233 (Figs. 9, 10, and 12) meshes with and drives a second bevel gear 421 mounted on a short inclined shaft 423 connected by a universal joint 425 with the upper end 427 of a telescopic shaft, best seen in Figs. 1 and 2. The lower end 429 of this telescopic shaft is connected by a second universal joint 431 to a short sleeve 433 joined to a short shaft 434, projecting obliquely rearwardly and upwardly from a gear housing 435 mounted on the right hand side frame 303 of the subject holding mechanism.

Referring now to Figs. 19 to 21, inclusive, the shaft 434 has pinned to its lower end a bevel gear 437 meshing with another bevel gear 439 pinned to a shaft 441 journalled in the gear box 435. Two spur gears 443 and 445, the latter of larger diameter than the former, are also pinned to this shaft 441. Parallel to the shaft 441 is a shaft 447 provided with a keyway in which slides a key on a sleeve 449 longitudinally slidable on the shaft. On this sleeve are fixed two spur gears 451 and 453, the former of larger diameter than the latter. The sleeve is also provided with a circumferential groove which receives a shifting yoke 455 pinned to a shaft or plunger 457 slidable longitudinally and projecting through the end wall of the gear housing 435, the outer end of the shaft having a control knob 459. A spring-pressed ball 460 (Fig. 20) tends to hold the shifting yoke 455 in one or the other of its two extreme positions.

When the knob is pulled to its extreme outer position, the yoke 455 moves the sleeve 449 until this sleeve comes in contact with a stop collar 461 pinned to the shaft 447, in which position the gear 451 meshes with the gear 443. This position of the parts is illustrated in Fig. 21. The gear 443 is one-half the diameter of the gear 451, hence the shaft 447 is driven at one-half the speed of the shaft 441. When the control knob 459 is pushed inwardly to its inner limit of motion, the gear 451 is unmeshed from the gear 443 and the companion gear 453 is meshed with the gear 445 on the shaft 441. This position of the parts is illustrated in Fig. 20. The gear 445 is the same diameter as the gear 453, hence the shaft 447 is now driven at the same speed as the shaft 441.

On the shaft 447 is a second shiftable assembly comprising a pair of spaced arms 465 rotatable as well as slidable longitudinally on the shaft 447, the arms being connected to each other at one end by a screw 467 and spacer block 469. The other ends of the arms 465 extend outwardly through an opening 511 in the casing 435 and are connected by screws or bolts 471 passing through a spacer block 473 (Fig. 22) to which is pivoted at 475 a bracket 477 carrying a control knob 479 and a pin 481, the bracket 477 being constantly pressed in a counterclockwise direction by a spring plunger 483. Mounted on the shaft 447 between the two arms 465 is a pinion 491 which, like the sleeve 449, has a spline or key fitting loosely in the keyway of the shaft 447, so that the pinion is free to slide longitudinally on the shaft but must turn therewith.

Also mounted between the arms 465, at some distance from the shaft 447, is a gear 493 meshing with and turned by the pinion 491. By sliding the arms 465 longitudinally on the shaft 447, and at the same time properly adjusting the angular relationship of the arms 465 in a rotary direction around the shaft, the gear 493 can be brought into mesh with any one of the steps of a cone gear 495 pinned to a shaft 497 parallel to the shafts 447 and 441. To this shaft 497 is also pinned a pinion 499 meshing with a second pinion 501 pinned to the shaft 503 of the feeding roller 313.

As the gear 493 is shifted to successively larger diameter steps of the cone gear 495, the arms 465 carrying the gear 493 must, of course, be swung farther around the shaft 447. Hence the opening 511 (Fig. 15) through which the arms 465 extend has inclined upper and lower edges, as shown. Adjacent the upper edge of the opening 511 are a number of holes 513 into which the pin 481 (Fig. 22) of the knob 479 may extend, to lock the gear 493 in any given position in mesh with any selected one of the steps of the cone gear 495. To unlock the gear to shift it to meshing engagement with another step, the knob 479 is pulled outwardly, swinging the bracket 477 about the pivot 475 against the force of the spring plunger 483. This pulls the pin 481 out of the hole 513 in which it is set, and permits the knob 479 to be shifted laterally in one direction or the other, to place the pin 481 in any other selected hole, to establish a different driving relation between the gears.

To assist in properly meshing the gears for any given speed relationship, there is placed on the casing immediately above the opening 511, an indicia plate 517 containing various markings as shown in Figure 16. Graduations on this plate, marked with numerals from 50 to 100 and from 100 to 200, refer to the various holes 513 in which the pin 481 may selectively be placed.

When the control knob 459 of the plunger 457 is moved all the way inwardly (to the position shown in Fig. 20) and when the control knob 479 is so placed as to mesh the gear 493 with the smallest diameter step of the cone gear 495, then the driving relation of the parts is such that the feeding rollers 313 and 315 move the subject to be copied at twice the speed of travel at which the feeding roller 55 moves the sensitized film strip, thus being adapted to make a print of 50% of the size of the subject, assuming the camera is properly focussed for this size. When the knob 479 is shifted to mesh the gear 493 with successively larger steps of the cone gear 495 (without changing the setting of the control knob 459) the rate of driving the feeding rollers 313 and 315 becomes progressively less and less (inversely proportionally to the numerals on the upper graduated line on the indicia plate 517 shown in Fig. 16) until, with the gear 493 meshed with the largest diameter step of the cone gear, the rollers 313 and 315 will feed the subject at exactly the same rate of travel as the film is fed by the roller 55.

If the control knob 459 of the plunger 457 is pulled out to its outermost position, meshing the gear 443 with the gear 451, then the shaft 447 and all following shafts throughout the train are driven at just half the speed at which they are driven when the knob 459 is at its innermost position. So if, with the knob 459 pulled out, the gear 493 is still meshed with the largest diameter step of the cone gear 495, the subject to be copied will be driven by the rollers 315 and 313 at just half of the speed of travel of the film by the roller 55, thus adapting the parts to making a print of twice the size or 200% of the size of the subject, if the camera is properly focussed for this size. If the gear 493 be meshed with the smallest step of the cone gear, the subject and the film will be driven at equal speeds. When meshing with other steps of the cone gear (the control knob 459 remaining in its outermost position) various intermediate speeds will result, proportional to the reciprocals of the respective numerals on the lower graduated line on the plate 517 in Fig. 16.

In addition to setting the gearing in order to control properly the relative speeds of travel of the subject and of the film, it is also necessary, of course, to focus the camera properly for each new ratio of enlargement or reduction. This is most conveniently done by employing the usual scales customarily provided in connection with the camera body and the copyholder in commercial copying cameras of this kind, these scales preferably being graduated in percentages, corresponding to the percentages shown in the gear setting indicia plate 517 of Fig. 16, and the percentages shown in the exposure slot setting plate 165 of Fig. 4. For example, as shown in Fig. 2, the top rail 33 of the supporting frame of the camera body carries a scale 521 graduated in percentages, cooperating with an index finger 523 on the camera body. Likewise one of the vertical posts of the supporting frame carries a scale 525, also graduated in percentages and cooperating with an index finger 527 on the bracket 301 which supports the device for holding and feeding the subject to be copied.

*Operation*

If it is desired to make a copy of the original document or other subject on a scale twice the size of the original (that is, 200% of the size of the original) then the camera body 39, 41 is moved along the supporting rails 33 until the index finger 523 is opposite the numeral 200 of the scale 521. Likewise the supporting bracket 301 of the copyholding device is moved along the vertical rails 117 until the index finger 527 is opposite the scale number 200 of the scale 525. The magazine section 41 of the camera body is opened to obtain access to the exposure slot controlling knob 151 (Figs. 3 and 4) and this knob is turned to bring the index mark thereon opposite the graduation numeral 200. Also the control knob 459 (Figs. 15 and 20) is pulled outwardly to its outermost position as shown in Fig. 15, and the control knob 479 is shifted to place the pin 481 in the outermost one of the series of holes 513 (the position shown in Fig. 15) thus meshing the gear 493 with the largest diameter step of the cone gear 495. These 200% settings of all of the parts just mentioned are the settings shown in Figs. 2, 3, 4, 15, and 21.

Now if the film (for example, sensitized paper) is properly threaded through the focal plane of the camera body and the magazine section is closed in a light-tight manner, and if the motor 211 is set into operation, the lights 381 to 387 are turned on, and a suitable subject S to be copied is placed on the shelf 371 and moved rearwardly until the advancing edge thereof is caught in the nip between the rollers 313 and 343, the result will be that these rollers, together with the rollers 315 and 345, will feed the subject S between the supporting plate 311 and the transparent plate 363 at a speed of travel just half as fast as the speed at which the film P is fed by the rollers 55 and 57. As any given point on the subject passes beneath the transparent plate 363, it will be illuminated by the light from the lamps 381 to 387 and light rays from the illuminated subject will pass upwardly to the prism 115, then rearwardly through the lens system within the casing 113, and into the camera (the shutter, if any, being open, of course) and the image will pass through the exposure slot in the plates 121 and 135 and fall upon the sensitized film, affecting it photographically. The image of any given point on the subject will travel across the focal plane of the camera, but will travel at exactly the same speed as that at which the film is traveling, at least during the limited time necessary for the image to advance across the narrow exposure slot, so that a clear, sharp image on the film results.

The film, after being thus exposed during its downward travel past the exposure slots 125, 137, continues downwardly between the feeding rollers 55 and 57, thence passing through the opening 85 in the bottom of the magazine section of the camera body, and curving downwardly and rearwardly as seen in Fig. 3, entering between the conveyor belts 93 and 95, which run through the conveyor housing 91 (Fig. 1) by which the exposed strip is conveyed into the dark room 101, where it is developed, washed, and fixed.

As the feeding motion of the subject continues, the portion of the subject which has already been photographed during passage under the transparent window 363, accumulates in rolls or folds in the trough 405, 407, 409, until finally at the completion of the passage of the entire length of subject, all of it lies in the trough and may then be removed by the operator and disposed of as desired.

When all of the subject has been photographed, operation of the motor 211 is continued long enough to be sure that all of the photographed portion of the film has been fed downwardly to a position below the level of the knife 79. Then the motor 211 is turned off to stop the feeding of the sensitized film, the severing knife 79 is operated by movement of the handle 71 to cut the exposed portion of the film from the unexposed portion, and the motor is again turned on, the handle 69 being turned at this time to shift the roller 57 away from the feeding roller 55 so that further feeding of the film will not occur during this period of motor operation. The motor will, however, drive the conveyor belts 93 and 95 to carry into the dark room the exposed film still remaining in the machine, and when this has been done, the motor may again be turned off.

For making photographic reproductions of other sizes than the 200% size above described, the photographing procedure is exactly the same, but in advance of starting the photographing procedure, the various parts of the mechanism must be set according to the size of the reproduction desired. There are four things to be set at various positions for various sizes or ratios of reproduction, namely, the focusing setting of the camera body so that the finger 523 is at the proper position on the scale 521, the focusing setting of the subject holder so that the finger 527 is at the proper position on the scale 525, the setting of the exposure slot by turning the knob 151 until the index mark thereon is at the proper position on the scale plate 165, and the setting of the gearing control knobs 459 and 479 in accordance with the instructions on the scale plate 517.

The same series of graduating numerals appear on all four of the scales mentioned, so that it is a simple matter for even an inexperienced person to make all four of these settings quickly and accurately, insuring proper synchronism and adjustment of the various parts.

It will be noted that for making reproductions of 100% size (that is, copies of equal size with the originals) the gearing may be set in either one of two ways. Either the knob 459 may be pulled out and the knob 479 may be placed at its innermost position, or else the knob 459 may be pushed in to its innermost position and the knob 479 may be shifted to its outermost position. The result is the same in either case. But for all ratios of reduction or enlargement, there is only one proper position for the gearing parts, all reductions being made with the plunger 459 in its innermost position, and all enlargements being made with the plunger in its outermost position, as clearly indicated on the plate 517 of Fig. 16.

It will be appreciated by those skilled in the art that the utility of the present invention is not confined to photographing relatively long strips. Individual sheets, of ordinary letter size or any other size customarily photographed individually by a single exposure, may be fed through the subject holder and be photographed satisfactorily with the present apparatus. Moreover, a series of individual sheets may be fed through in rapid succession, with the advancing edge of each successive sheet abutting against or spaced but a small fraction of an inch behind the trailing edge of the preceding sheet, and all of such individual sheets may be photographed on a single continuous strip of film, which may be cut up to make individual prints of the individual original sheets, after the film has been developed, fixed, and dried.

While one embodiment of the invention has been disclosed, it is to be understood that the inventive idea may be carried out in a number of ways. This application is therefore not to be limited to the precise details described, but is intended to cover all variations and modifications thereof falling within the scope of the appended claims.

We claim:

1. Photographic copying apparatus including a camera and a subject holder mounted for focusing movement relatively to each other to produce photographic copies of different size ratios to the subjects being copied, a masking device including an exposure slot of variable width for masking all but a relatively minor portion of the film in the focal plane of the camera during the making of an exposure, graduated focusing scale means associated with said camera and said subject holder for indicating the proper focusing setting of said camera and said subject holder relatively to each other for producing copies of predetermined size ratios, means for adjusting the width of said exposure slot, and scale means associated with said slot adjusting means and graduated in the same indicia terms appearing on said focusing scale means for indicating the proper setting of said slot adjusting means for any given focusing setting of said camera and subject holder.

2. Photographic copying apparatus comprising a camera, a subject holder, means for feeding a subject in said holder at different speeds to produce copies of different size ratios to the subjects copied, control means for varying the speed of feeding of said subject, a scale associated with said control means and graduated to indicate different settings of said control means corresponding to different size ratios, motor means for driving said subject feeding means, a masking device having an exposure slot of variable width, means for adjusting the width of said slot, and scale means associated with said slot adjusting means and graduated in the same indicia terms as said control means scale for indicating the proper setting of said slot adjusting means for any given setting of said control means.

3. Photographic copying apparatus comprising a camera and a subject holder mounted for different focusing settings relatively to each other to produce copies of different size ratios to the subjects copied, graduated scale means associated with said camera and subject holder for indicating the proper focusing settings thereof for any predetermined size ratio, means for feeding a subject in said holder, control means for controlling the speed of feeding of said subject, scale means associated with said control means and graduated in the same indicia terms as said focusing scale means, motor means for driving said subject feeding means, a masking device having an exposure slot of variable width, means for adjusting the width of said slot, and scale means associated with said slot adjusting means and graduated in the same indicia terms as said scale means for said focusing settings and said control means for indicating the proper setting of said slot adjusting means for any given focusing and control means settings.

4. A camera having a housing, and a focal plane and a masking curtain therein, means for continuously feeding a sensitized film during exposure in said focal plane and a device for variably restricting the longitudinal extent and time of exposure of said film, said device comprising a first plate adapted to be removably positioned in said housing substantially in extension of said curtain with a face thereof substantially in said focal plane and having therein an exposure slot, a second plate supported for sliding movement relative to said first plate and having therein an exposure slot arranged to be adjustably overlapped with the slot of said first plate, said second plate having one edge of its slot lying at one side of the slot in said first plate and having the other edge of its slot extended to lie within the slot in said first plate with a face thereof substantially in the focal plane to sharply define said slot in said plane, parts on said plates arranged for engagement with and movable relatively to each other for sliding said second plate and adjusting the width of said slot, and index means for indicating the adjusted width of said slot.

5. Photographic copying apparatus comprising a camera and a subject holder mounted for focusing settings relatively to each other to produce copies of different size ratios to the subjects copied, graduated scale means associated with said camera and said subject holder for indicating the proper focusing settings thereof relatively to each other for any predetermined size ratio, a masking device comprising a first plate adapted to be removably positioned in said camera adjacent the focal plane thereof and having an exposure slot, a second plate supported for sliding movement relatively to said first plate and having therein an exposure slot arranged to be adjustably overlapped with the slot of said first plate by the sliding movement of said second plate to vary the width of said slot, parts on said plates arranged for engagement with and movable relatively to each other for sliding said second plate, and index means graduated in the same indicia terms as said focusing scale means for indicating the proper relative movement of said parts for any given focusing setting of said camera and subject holder.

6. Photographic copying apparatus comprising a camera, a subject holder, means for feeding a subject in said holder at a variable speed, control means for varying said speed, scale means associated with said control means and graduated to indicate different settings thereof corresponding to different ratios of reproduction, motor means for driving said subject feeding means, a masking device comprising a first plate adapted to be removably positioned in said camera adjacent the focal plane thereof and having therein an exposure slot, a second plate supported for sliding movement relatively to said first plate and having therein an exposure slot arranged to be adjustably overlapped with the slot of said first plate by the sliding movement of said second plate to vary the width of said slot, parts on said plates arranged for engagement with and movable relatively to each other for sliding said second plate, and index means graduated in the same indicia terms as said control means scale for indicating the proper relative movement of said parts for any given setting of said control means.

7. Photographic copying apparatus comprising a camera and a subject holder mounted for different focusing settings relatively to each other to produce copies of different size ratios to the subjects copied, graduated scale means associated with said camera and subject holder for indicating the proper relative settings thereof for any predetermined size ratio, means for feeding a subject in said holder, control means for controlling the speed of feeding of said subject, a scale associated with said control means and graduated in the same indicia terms as said focusing scale means, motor means for driving said subject feeding means, a masking device comprising a first plate adapted to be removably positioned in said camera adjacent the focal plane thereof and having therein an exposure slot, a second plate supported for sliding movement relatively to said first plate and having therein an exposure slot arranged to be adjustably overlapped with the slot of said first plate by the sliding movement of said second plate to vary the width of said slot, means for sliding said second plate, and index means graduated in the same indicia terms as said focusing scale means and said control means scale for indicating the proper setting of said plate sliding means for any given settings of said camera and subject holder and of said control means.

PAUL LANDROCK.
ARTHUR W. CAPS.